United States Patent
Harper et al.

(10) Patent No.: US 11,835,458 B2
(45) Date of Patent: Dec. 5, 2023

(54) DEVICE AND METHOD FOR STEALTH DETECTION AND DATED CONFIRMATION OF SMOKING AND VAPING

(71) Applicant: PASSIVE DETECTION SYSTEMS LLC, Las Vegas, NV (US)

(72) Inventors: Joseph Cole Harper, Chesterfield, MO (US); Bruce Bachman, Anaheim, CA (US); Richard Bracke, San Marcos, CA (US)

(*) Notice: Subject to any disclaimer, the term of this patent is extended or adjusted under 35 U.S.C. 154(b) by 0 days.

(21) Appl. No.: 17/256,790

(22) PCT Filed: Mar. 18, 2020

(86) PCT No.: PCT/US2020/023420
§ 371 (c)(1),
(2) Date: Dec. 29, 2020

(87) PCT Pub. No.: WO2020/150754
PCT Pub. Date: Jul. 23, 2020

(65) Prior Publication Data
US 2021/0372926 A1    Dec. 2, 2021

Related U.S. Application Data

(60) Provisional application No. 62/794,448, filed on Jan. 18, 2019.

(51) Int. Cl.
*G01N 15/06* (2006.01)
*G01N 15/00* (2006.01)
*G01N 21/64* (2006.01)
*G06Q 30/04* (2012.01)
*G01N 21/33* (2006.01)

(52) U.S. Cl.
CPC ..... *G01N 21/6447* (2013.01); *G01N 15/0606* (2013.01); *G01N 21/33* (2013.01); *G01N 21/6456* (2013.01); *G06Q 30/04* (2013.01); *G01N 2015/0046* (2013.01); *G01N 2021/6417* (2013.01)

(58) Field of Classification Search
CPC .......... G01N 21/6447; G01N 15/0606; G01N 21/33; G01N 21/6456; G01N 2015/0046; G01N 2021/6417; G01N 2021/649; G06Q 30/04
See application file for complete search history.

(56) References Cited

U.S. PATENT DOCUMENTS

2018/0224373 A1 * 8/2018 Lincoln .................. G01N 21/31
2018/0252654 A1 * 9/2018 Lincoln .................. G01N 21/94

* cited by examiner

*Primary Examiner* — Courtney D Thomas
(74) *Attorney, Agent, or Firm* — Donn K. Harms (57) ABSTRACT

A smoking detector having a body with a substrate which has a smoking particle capturing surface area positioned upon it. The particle capturing surface area is configured to attract and adhere to airborne smoking particles released in smoke emitted from burning tobacco or marijuana or a Vape device. Smoking particles captured within the particle capturing surface area will luminesce when exposed to UV light providing physical proof that smoking occurred in the room or vehicle where the detector was placed during a defined time period.

11 Claims, 4 Drawing Sheets

DEVICE AND METHOD FOR STEALTH DETECTION AND DATED CONFIRMATION OF SMOKING AND VAPING

This application claims the benefit of Provisional Patent Application No. 62/794,448 which was filed on Jan. 18, 2019, and is incorporated herein in its entirety.

FIELD OF THE INVENTION

The disclosed device and method herein relate generally to the stealth detection of smoking by smokers within a determined location. More particularly, it relates to a device configured for the covert and/or overt detection of smoking by a person within a defined space such as a hotel or motel room or vehicle, and method of employment thereof, providing physical evidence of smoking in a determined area surrounding the device which is confirmable by date. Such is provided by nondestructive detection of a plurality of device-captured airborne chemical constituents on a particle capture layer of the device. When excited by UV energy of specific UV wavelength(s) or UV wavelength ranges resulting in lower energy UV emission captured particles will fluoresce in a visually discernable manner and thereafter provide physical documentation evidencing smoking in a room or defined area upon a particular date. The device, so configured, enables a method of monitoring for prohibited smoking which is date-verifiable, to thereby hold occupants of a room, space, vehicle or the like, on a given date, liable for smoking therein.

BACKGROUND OF THE INVENTION

Tobacco, in its earliest form, was first discovered, cultivated and used in the Mesoamerica or "Middle America" and South America as early as 500 AD of the historical regions of North America, home to the Mesoamerican civilization, which comprised a group of persons with close cultural and historical ties, in what today are central Mexico, south through Belize, Costa Rica, Nicaragua and northern coastal Peru. The word tobacco is believed to have originated in the Caribbean.

Of the timeline following the arrival of the Spanish being defined as the Colonial Period, pre-Columbian societies flourished before the Spanish conquests and colonization of the Americas in the 15th and 16th centuries. Mesoamerica is one of six areas in the world where ancient civilization arose independently. Long before the arrival of Spanish and their colonization, tobacco smoking and smoke had become a recreational and/or cultural main stay. The Spanish introduced tobacco to Europeans in 1528 and by 1533 tobacco use rapidly flourished, with tobacco being cultivated by the French in the mid-1500's and remains a staple crop to this day.

In the early US, tobacco was primarily used in cigars and pipes, chewing tobacco and as snuff. Cigarettes were first introduced into the US in the early 19th century as a leaf-only product and by the time of the Civil War, cigarette use was of such popularity that a Federal Excise Tax was imposed upon cigarettes in 1864. In FY2015, US excise taxes upon tobacco products including but not limited to chewing tobacco, cigarettes, cigars, pipe tobacco and roll-your-own totaled some $14.5 billion and accounted for nearly 15% of all Federal Excise Tax revenue.

On Jan. 11, 1964, Dr. Luther L. Terry M. D., Surgeon General of the US at the time, released Smoking and Health: Report of the Advisory Committee of the Surgeon General of the Public Health Service—the first Federal Government official report linking smoking and specific diseases. This landmark publication was based on 7,000+ articles related to smoking and disease published in numerous medical journals. As a result, the Advisory Committee concluded that cigarette smoking contributed to lung and laryngeal cancer in men, was probable cause for lung cancer in women and was the leading cause of chronic bronchitis.

In 1965, the US Congress adopted the Federal Cigarette Labeling and Advertising Act as well as the Public Health Cigarette Smoking Act of 1969, requiring addition of health warnings onto cigarette packaging, banning of all tobacco-related advertising and initiated annual reports on health consequences of smoking. Since this period, the Advisory Committee's Clearinghouse and its successor, Center for Disease Control and Prevention's Office on Smoking and Health released 30 reports on health consequences of smoking to diminish the impact of tobacco use on the health of the American population. It was not until 1994 that the US Food and Drug Administration officially recognized nicotine as a dug that produced (chemical) dependency—being a sedative and a stimulant.

From Federal and State-funded research over the years on tobacco and tobacco use, more than 7,000 different chemicals have been identified to exist within tobacco smoke—of which 250 are known to be harmful to humans, including ammonia, carbon monoxide and hydrogen cyanide. Among these 250 harmful chemicals in tobacco smoke, at least 69 have been scientifically proven to be cancer inducing.

While the act of smoking is directly linked to a person or persons smoking—inhaling and exhaling smoke, secondary smoke from pyrolysis of all forms of tobacco, as well as smoke exhaled from smoker(s) contributes to health consequence and/or increased mortality from exposure to secondary or second-hand smoke. Because of this problem, smoking has been prohibited in many States in public areas such as restaurants, as well as in privately owned venues such as hotels, motels, and in rental cars and the like.

From a safety standpoint, smoking traditionally has been prohibited in theaters and public venues where components and/or buildings are susceptible to combustion from ignition and/or where possible explosions might result. Such venue related prohibitions include but are not limited to coal mining dust and/or silo dust from stored grains, use of pure oxygen, ether or alcohols in healthcare, flammable liquids such as refined gasoline, white gas, spirits and/or vapors from natural gas and/or flammable chemicals and/or solvents in solid, gas or liquid states.

In recent years, within the USA, for example in 1988, smoking became banned by US Department of Transportation—USDOT, on commercial airline flights of less than two hours duration and entirely on domestic and international airline flights by US-flagged airlines and all international flights by foreign airlines entering US airspace. In 2015, USDOT banned all forms of electronic cigarettes on flights and in checked luggage. Prior to this time, smoking seating sections existed within domestic and international flagged carriers—notably of far aft seating, often with a short hanging curtain separating smoking section from the rest of the non-smoking portions of the aircraft. International flagged carriers using 747 aircraft had a small cordoned off section on the upper deck for smoking—generally used by aircraft crew members who smoked.

This progression to ban smoking evolved further in 2006 to hotels. For example, all 2,800 Marriott hotel and corporate apartment properties—over 400,000 guest rooms under Marriott ownership in the US became the largest hotel chain to become 100% smoke-free throughout all property buildings, with special outside designed smoking areas. Other major hotel brands followed suit shortly thereafter. While in certain areas of the US, hotel rooms allowing smoking may still be found—particularly in Las Vegas, the overwhelming number of US hotel and/or vacation properties are nonsmoking. A primary driver of this policy is that guests subsequently occupying a room vacated by a smoker, complain about the smell and frequently request new rooms which are expensive in labor and time to the hotel.

Because of this, parties disregarding non-smoking policies, may be liable for room cleaning recovery fees. Such fees are billed to guests failing to comply with non-smoking policies to recover the extensive costs of returning hotel and hotel suite rooms to smoke-free conditions. However, true costs of cleaning and loss of hotel revenue combined are far more than the billed penalty fees—which currently average only $250. Moreover, it is nearly impossible to fully remove 100.0% of the residual airborne particles and odors resulting from smoking and/or vaping from all physical surfaces within a hotel or hotel suite property.

Vehicle rental agencies have an even greater challenge in non-smoking policy enforcement—as renters simply lower one or more windows while driving and smoking. While all major car rental agencies have strict non-smoking policies, smoking and/or vaping is pervasive and difficult to enforce due to the inability to provide physical proof of smoking which self-authenticates as to date and time of occurrence. Consequently, one major US car rental agency no longer pursues non-smoking enforcement at all and simply absorbs the extensive losses, accepting ongoing customer problems, brand name damage, inconvenience and smoke and/or vape-related health issues to rental staff, vehicle renters and/or passengers.

Ocean and river cruise vessel lines have smoking issues similar to that of vehicle rental agencies—guests simply open a stateroom portal while smoking and/or vaping, erroneously believing harmful smoke and/or vape disappear through the portal as if by magic while the cruise vessel is underway.

Within the US, nearly all businesses, government offices, public buildings, public venues and restaurants long ago initiated strict nonsmoking policies. Premium high-end restaurants may add secondary outdoor guest venues having separate air handling systems specifically to accommodate guests who smoke and/or vape to circumvent local and/or provincial ordinances regarding smoking, vaping and second-hand smoke and/or vape-related health issues.

Smoking tobacco is a physiological addiction to the human body. Among the many chemical components within tobacco and tobacco smoke is nicotine, which acts upon cholinergic receptors of the adrenal glands, brain, heart, muscles, nerves and to all body vital organs, as well as upon cognitive functions, including but not limited to behavior, memory, perception, reasoning, respiration and thought processing. Normally, neurotransmitter receptors of the brain and central nervous system are controlled by acetylcholine—Ach, derived from choline within the body. Nicotine, from chewing or smoking tobacco and/or vaping with added nicotine, affects acetylcholine and its receptor cites—effectively decoupling or blocking acetylcholine as well as voltage inhibition of cation channel-receptors and synaptic transmission. This is how nicotine use leads to its strong euphoric and often overpowering addictive properties—craving for a cigarette and/or other tobacco products as well as intense withdrawal symptoms, manifested as uncontrollable cravings for nicotine from tobacco products.

This is why cessation of smoking is so difficult if not impossible for many to achieve—the intense cravings and "kick" of the first cigarette in the morning since all the nicotine has been assimilated and/or consumed within the body and the spike in nicotine stimulates the adrenal glands, which releases adrenaline—the sudden and intense "fight or flight" response, while increasing glucose levels which further activates the brain, increases heart rate, respiration and blood pressure. Nicotine also suppresses insulin levels, further increasing glucose levels—heightening one's senses. Nicotine also influences levels of dopamine, also a neurotransmitter involved in signal pathways of amygdala, which plays a part in emotions processing and the hippocampus—important for memory, directly influence roles in motivation, movements, reward, sensations of pleasure & pain and thought processing. Thus, nicotine from tobacco smoke and/or vaping, within the body metabolically drive a smoker to experience intense emotions, pleasurable sensations and raises feelings of contentment. Conversely, depending on the concentration of nicotine within the body and a person's nervous systems arousal, nicotine may also act as a sedative.

Upon inhalation of smoke from tobacco, nicotine rapidly enters the bloodstream with research studies showing nicotine is rapidly absorbed into the bloodstream and starts to affect neurotransmitter receptors of the brain and central nervous system within 10 to 20 seconds of inhalation of smoke and/or second-hand smoke. After cessation of smoking and/or vaping with inhalation of smoke and/or vape containing nicotine, metabolic levels of nicotine within the body are reduced by half after two hours.

The same would be said for second-hand smoke and/or vape of nicotine content inhalation, with the notable exception of nicotine and other chemical components within smoke and/or vape from acts smoking and/or vaping such as polycyclic aromatic compounds—PAH's, tar and the hundreds of carcinogenic and/or harmful chemicals compounds from acts of smoking and/or vaping that are communicated into a smokers' environment and surroundings—second hand smoke and/or vape are upon all objects and/or persons within near-by proximity.

The levels of nicotine in the body from smoking and/or secondary smoke depend upon a combination of multiple factors—the type of tobacco used in acts of smoking, degree of smoke or vape inhalation and time until exhalation, if a filter is used and type of filter, persons age and health of lung tissue.

Nicotine is decomposed within the liver while metabolic NADPH activity converts nicotine into nornicotine, of which some level is exhaled along with nicotine as it passes the capillary blood/lung tissue barrier, as well as excretion from the body through urination—and is a common laboratory test indicating acts of smoking. Nornicotine is also the chemical precursor to the known carcinogen N-nitrosonornicotine, created during the curing and processing of tobacco leaves used in cigarettes and cigars and released from acts of smoking.

Tobacco products that are chewed, placed within the mouth and/or snorted release considerably larger amounts of nicotine into the body over smoking and/or vaping. Such is the venue for nicotine chewing gum, lozenges, inhalers and/or patches worn on the skin—nicotine replacement therapies (NRT's) with varying decreasing levels of added nicotine content to aid in reduction or cessation of smoking and nicotine addiction.

Tolerance to nicotine increases with the amount of nicotine consumed which requires persons smoking, vaping, chewing or using snuff to increase frequency of use to derive the same initial metabolic effects of nicotine. Nearly all nicotine leaves the body during sleep via a plurality of pathways, with nicotine tolerance virtually disappearing upon awakening—further reinforcing the intense cravings and "kick" of the first cigarette of the day.

Nicotine or *Nicotiana tabacum*, the form of nicotine found in tobacco plants, in and onto itself is not cancer inducing, but the plurality of chemicals associated with tobacco smoke from acts of smoking and/or vaping are cancer inducing and/or harmful from the presence of smoke and/or vape air borne particulate matters into the surroundings as well as exposure to persons from second-hand smoke and/or vape from acts of smoking and/or vaping. The harmful effects of nicotine were so pervasive that by the late 19th century, lawmakers came to realize the dangers of nicotine and in 1890, 26 states had passed legislation banning sales of all nicotine products to minors.

Tar is the common name given the resin-filled particulate matter produced from partial pyrolysis of tobacco, tobacco related components and/or plant materials from acts of smoking and contains the cancer-inducing and highly toxic chemical compounds notably found within all tobacco smoke. Upon inhalation, tar forms a sticky layer inside lung tissues, permanently coating millions of alveolar epithelium cells which normally allow oxygen and carbon dioxide respiratory exchange pathways between lung and capillary blood vessels, leading to emphysema, other respiratory problems and may ultimately lead to lung cancers. Tar is also the yellow and tacky resinous film that once airborne, adheres to any and all surfaces tobacco smoke comes into direct or indirect contact with. Tar is also the yellow residue staining smoker's teeth and cigarette filters. There is no known medical cure or metabolic remedy for tar.

In 2017, the world's population was estimated to be approximately 7.6 billion persons with some 1.1 billion persons smoking and/or vaping, as estimated by the World Health Organization (WHO), with predictions of the number of smokers increasing to 1.6 billion by 2025—80% being male. Worldwide, it is estimated that cigarette usage is ~1,083 cigarettes per year per person over the age of 14. Of the 182 countries in the WHO study, US ranks at 69 with 1,016 cigarettes per year per person. Andorra is first with 6,393 cigarettes per year per person. Hong Kong is ranked 4th at 2,911 cigarettes per year per person with China, ranked at 15, with 2,043 cigarettes per year per person—but produces and consumes 30% of the world's cigarettes, as of 2014.

Smoking rates in the US dropped in half from the period of 1965 to 2012, falling from 42% to 18%. The states of Kentucky, Mississippi and Oklahoma have the highest percapita smoking rates while California, Idaho and Utah have the lowest per capita smoking rates. Within the US, it is estimated that nearly 17% of adult males and 14% of adult females are smokers. At present, over 16 million persons in the US live with one or more diseases caused directly or indirectly from smoking and/or vaping. Smoking leads to over 480,000 deaths annually within the US, either directly through acts of smoking or indirectly through second-hand smoke. More persons die as a result of smoking than all deaths due to alcohol and/or drug abuse, HIV, murder, suicide and/or vehicle accidents combined. Within the US, the three leading causes of premature deaths are from cancers, heart attacks and Hospital Acquired Infections—HAI's, also known at Healthcare Acquired Infections or HCAI in the EU. And of cancers, the effects from smoking and second-hand smoking chemical constituents are the leading cause of all forms of cancer.

Over the decades, major tobacco companies learned to refine and focus tobacco products to best satisfy consumer needs and tastes though various means, including but not limited to advertising, marketing, packaging, perceptions, products and meeting government regulations. In 1954, Leo Burnett came up with the original concept of the Marlboro Man—"Come to where the flavor is" and was an iconic advertising icon for Marlboro brand cigarettes. Originally portraying rugged men outdoors at one with nature, focus shifted to cowboys in rugged western environs—a long time epic America life style of the old west. At that time, filtered cigarettes were presented as being safer than non-filtered cigarettes, but were considered feminine and Marlboro Man became one of advertising most brilliant campaigns of all time—even to present day. Cowboys were exceedingly popular due to creative western novels, western movies and a number of hugely popular western television shows in the 1950's about life in the US old west. Marlboro Cowboy and Marlboro Territory become true icons. A number of male models who portrayed the Marlboro Man died of smoking-related illnesses. Ironically the Marlboro brand was released to the US market in 1924 as a woman's cigarette. In 1954 Marlboro brand market share was but 1% when Marlboro Man ads were first introduced and within one year, market share catapulted to 4th place. By 1972, use of real cowboys were used under a re-branding campaign started in late 1963, and Marlboro became the leading cigarette brand sold within the US and the market leader in overseas cigarette sales.

Hollywood and TV productions also used tobacco and cigarettes as high fashion statements for women and male stars in hugely popular movies and TV shows—motorcycles, slicked hair and rebellious rock & roll—smoking cigarettes. All portrayed images and perceptions to American youth of being cool, independent and aloof—and the popularity of cigarettes and cigarette smoking soared.

Every vehicle manufactured in the US had a cigarette lighter and one or more ashtrays. Airline seats had an ash tray built into each arm rest. Passenger train cars had ashtrays at every window. Every restaurant table, counter, bar, men's urinals, building entrance and elevator doors, church entrance had ash trays throughout the US and much of the world. Nearly every home had multiple ash trays for guest use or one's own use. Match books were sold and/or given away by the tens of millions as well as every casino, hotel, lounge and motel gave away plain or decorated free ash trays as advertising. Cigarette boxes, cigar humidors, pipe stands and a smoker's ultimate incendiary apparatus of choice, long before disposable lighters—a personalized Zippo Lighter with Ronson flints and lighter fluid, became de rigueur to own. Zippo now owns Ronson within the US.

In the latter half of the 20th century, business and government buildings started to segregate smoking and non-smoking areas. In federal, local and provincial government buildings, facilities initiated non-smoking enforcement policies, while business pursued mixed-use, limited or non-smoking enforcement in public venues including but not limited to airlines, casinos, car rentals, churches, department stores, entertainment, hospitals, hoteliers, manufacturing facilities, military facilities, prisons, public buildings, restaurants, retailers, schools, services, sports facilities, taxis, theaters, train, metro and bus transportation and stations, universities, vessels and zoos—depending on the location and if any local legislated smoking ordinance restrictions.

Other than an airline flight, hospital, school or workplace, most smoker's daily routines do not commonly engage extended periods of time where smoking is severely restricted and/or is not at all permitted. The exception to this is of apartments, hoteliers—hotels, motels & suite hotels and vehicle rentals.

Apartments and apartment complexes often have a no-smoking clause in their leases—the entire property or the domicile apartments units per-se, but generally of the entire property including any underground parking structures.

Hoteliers have some legislative support for non-smoking policies. For example, California state law requires that all hotelier buildings be non-smoking with smoking being permitted outside, only in open-air areas. All major hotel brands within the US are exclusively non-smoking hotel properties with some foreign properties having smoking rooms available. Penalty fees average $250 per room. One major hotelier CEO states "There was a time when having the option of a smoking guest room made sense, but that is no longer the case. The old school thinking was that (hotels) were accommodating a portion of their guests. But when you talk to smokers, they don't even want smoking rooms." The move to ban smoking of all forms aligns with many hotel companies' efforts to help travelers, especially road warriors, stay healthy on the road.

Aside from the health concerns for guests, staff and visitors, the maintenance issues that stem from cigarette, cigar and/or pipe smoking and/or vaping have become significant. Hotel owners pay for added staff time and supplies needed to remove tobacco smoke odors and residues from guest rooms and/or suites. Housekeepers typically use odor-neutralizing chemicals as well as time-consuming such as cleaning carpet and HVAC filters, changing out all bedspreads, blankets, lamp shades, mats, sheets, robes and towels, dry clean draping and washing of doors, walls and windows. Rooms are removed from inventory to accommodate for cleaning time, costing the hoteliers even more revenue. There is also insurance liability, much less the losses of goodwill and revenue from turning away reservations—particularly where entertainment, meals and gambling bring in considerable hotel revenue well above and beyond the room or suite rack rate.

With regard to vehicle rentals, all major rental agencies have strict non-smoking policies on all vehicles. One rental agency allowed vehicles that were smoked in to become smoking vehicles for those that preferred them, but this policy was rescinded in February 2013 to an all non-smoking vehicle fleet. While individual vehicle rental agencies vary in their specific contracts language, fundamentally all state the same non-smoking policies—tobacco smoke leaves a residue on fabrics, fibers and surfaces of vehicles, which emits odors that many people find unpleasant. A non-smoking policy is designed to ensure enhancing the comfort of customers and employees. When a vehicle must be cleaned of tobacco smoke odor and residue, all surfaces must be treated and cleaned. This takes considerable time and requires a vehicle to be removed from the rental fleet until odor-free. This incurs incremental costs for special cleaning and lost revenue from the vehicle being unavailable for rental. Cleaning fees help to recover some of the costs associated with cleaning tobacco odor and residue from vehicles. With the exception of one major vehicle rental agency, all agencies charge a minimum $400 cleaning fee for vehicles returned with evidence of smoking. The one major vehicle rental agency charge is "up to $250".

In 1973 Oregon became the first state to legalize recreational use of marijuana. At present, there are 33 States plus the District of Columbia that have legalized medical and/or recreational uses of marijuana. Marijuana, like tobacco, contains nicotine, up to 4 times the amount of nicotine found in tobacco, but unlike tobacco, contains no tar. THC—tetrahydrocannabinol, is the chemical responsible for most of marijuana's psychological effects. It acts much like the cannabinoid chemicals made naturally by the human body. Cannabinoid receptors are concentrated in certain areas of the human brain associated with coordination, memory, pleasure, thinking and time perception. THC binds to these receptors and activates them—affecting one's concentration, coordination, memory, movements, thought processing, pleasure, sensory and time perceptions. THC also stimulates the brain to release dopamine, creating euphoria in the user, as well as hallucinations and/or delusions while interfering how information is processed in the hippocampus—part of the brain responsible for forming new memories.

Unlike nicotine, which starts to affect the neurotransmitter receptors of brain tissue and the central nervous system within 10 to 20 seconds of inhalation, THC may take minutes to take effect but dissipates more rapidly than nicotine. THC chemically falls into three main forms—neutral cannaboids of CBD, CBG and THC, cannaboid acids of CBDA, CBGA and THCA and the degradation product of THC-CBN.

While there are 17 states where smoking of marijuana is illegal, leaving 33 States and the District of Columbia where medical and/or recreational use of marijuana is legal. Which means apartments and apartment complexes, hoteliers and vehicle rental agencies in 33 States and the District of Columbia also need to contend with marijuana smokers along with tobacco smokers and thus smoke and second-hand smoke from marijuana in parallel with tobacco smoke and second-hand smoke.

However, a means to detect and legally prove and/or confirm acts of smoking of tobacco and/or marijuana or vaping have taken place, if and when one or a plurality of violations of strict non-smoking polices occur, at a reasonable cost, is currently lacking. Conventionally, housekeeping and/or maintenance staff look for physical signs of smoking and/or vaping upon apartment vacancy, hotel guest check out and/or rental vehicle return. Such might for example include ash or forgotten cigarette butts or cigars, burns in towels and/or on furniture, forgotten lighters and/or matches, smoking or vaping debris in waste cans and the like. Upon discovery, staff will then inform superiors and/or management who will bill the former tenant, guest and/or renter for recovery cleaning fees.

However, lacking any physical proof of smoking which is self-authenticating as to the date of occurrence, it is virtually impossible to legally prove smoking by an occupant since the primary means of determining prior smoking is odor or ashes left in place. However both may have come from a prior guest or occupant in the sequence of such, rendering it legally hard to match the deed with the individual. Such of course leaves the venue owner or rental agency or hotel to absorb the cleaning costs since physically discernable proof of smoking which is self authenticating as to date of occurrence is lacking.

While electrically powered devices using electronic sensors to check for acts of smoking exist, such devices have limitations including but not limited to capital cost, detection limitations, ease of circumvention, hard installation, installation costs, physical size, portability, power requirements, sensor replacement and witness ability.

The disclosed devices and methods herein provide a solution to the shortcomings of the present and prior art, through the provision of one or a plurality of daily deployable smoking detectors.

SUMMERY OF THE DISCLOSURE

The system and method herein operates through the employment of easily deployed smoke capturing components. The smoke capturing components have a planar body or substrate on which a smoke particle capturing layer is positioned on a first side thereof. The smoke particle capturing layer is configured to capture and entrap airborne particulate matter, chemicals and/or cancer inducing chemicals from smoke or nape for a duration of time it is situated in a room or vehicle. It can thus be placed in the room or vehicle on a known date and time and retrieved thereafter on a known retrieval date and retrieval time.

During a time of deployment in a room or vehicle or another enclosed area, particles emitted from acts of smoking and/or vaping which come into contact with the surface of the particle capturing layer of the device, are captured by the capturing layer. Thus, during a defined period of deployment in a room or vehicle or the like, the particle capturing layer of the device will capture any of the various types of smoking and vaping particles communicated to the air surrounding the device by a smoker. During the duration of deployment in a room or vehicle, the captured smoking particles in the capturing layer remain invisible to the naked eye and thus to the room occupant.

By particle capturing layer is meant a single or multi layer of polymeric or other material, which is formed of a material formulated to attract and adhere to and capture airborne smoking particles and other particulate released when tobacco or marijuana or a Vape device releases smoke into the adjacent air, and/or when a smoking user of such inhales and releases smoke into the air. By attract or adhere to is meant a polymeric or other material which, when cured and exposed to the air, will result in adhesive bonding, hydrogen bonding, ionic bonding, ion-induced dipole bonding forces, ion-dipole bonding forces, or van der Waals forces which result in a particle bonding to the particle capturing layer.

Such may be, in simple form, a single layer with pores or openings on or through the exposed surface layer sized to allow smoke particles into the layer and hold them. Such may be formed in a polymeric layer which has one or a plurality of layered sections, with a charge or with a tackiness to capture such particles.

In one such layered section mode, the particle capturing layer may be a top layered section with openings there through communicating with an underlying layered section which is adhesive or ionicly or otherwise particle-attracting in nature, or has a charge which will attract that of the smoke particles and pull them through the openings to a captured position in the particle capturing layer.

A particularly preferred coating is formed of HFC UV cured material as it works especially well for attraction and capture of airborne chemical particles of smoke and nape. HFC is made up of 3 different UV curable polymers which cross link under UV energy of sufficient strength to initiate such cross-linking. Unlike conventional free-radical UV cured materials, HFC has a substantially cationic chemistry because the photo initiators and co-initiators start a chemical reaction which continues to cross-link beyond the time of UV exposure. Conventional free-radical UV cure chemistry, from which is the majority of other such UV coatings are formed, start and immediately cease curing based on a chemical free-radical that is only created through UV range wavelengths. Once the UV light cease, so does all cross-linking.

In a preferred mode of the device herein, employing such HFC in the particle capturing coating, each of the 3 cationic chemistry polymers, are of a single, dual and 8-ligand reactive site polymers. Because of this continuing cross-linking, the external exposed surface of the preferred HFC material forming the particle capturing layer, which is directly in communication with room air, has large numbers of depressions therein, most of which communicate with internal passages or capillaries formed below the surface. This provides significantly increased porosity over other such UV or other cured polymeric material.

Further, the formed material with depressions and internal passages or capillaries increase surface layer of the particle capturing layer available for particle capturing. These surfaces have a charge which will attract and hold charges of airborne chemical particles.

Still further, the preferred HFC material, even when aged for months, will have a particle capturing exposed surface area formed of depressions on the surface which are in communication with elongated and serpentine passages or capillaries positioned below the exposed surface which form a secondary particle capturing area. This secondary particle capturing surface area is far greater than just the exposed surface area of the capturing layer. Thus, the HFC material, when cross-linked in a partial cure of the secondary particle capturing area, which ceases once the curing light is removed, essentially forms the first particle capturing area as an exposed skin on the exposed surface which is exposed to the surrounding air, which is only several molecules deep, which has depressions or cavities formed therein. This first particle capturing area is adjacent to and attached to the underlying partially cured secondary particle capturing area which has serpentine passages therein communicating with the depressions.

A majority of the formed depressions communicate with under-skin passages or capillaries formed in the underlying secondary capturing area which acts like a sponge which continuously, attracts and captures smoke particles and other air particles in the highly porous and enormous passage surface areas, with millions of charged ligands therein. Thus, airborne chemical smoking particle components are captured and held by HFC material due to its porous nature and capillary action drawing the particles to and into the material and tunnels therein. Essentially, what goes in never can come out. Currently forming the passages and the depressions communicating with those passages, with a diameter in a range between $10^{-9}$ meters, and $275 \times 10^{-12}$ meters, is preferred, as this allows a free flow of smoking particles into the particle capturing layers into which they are attracted.

The charged ligands within the secondary particle capturing layer of polymeric material, which remain active due to only partial cure, behave like ionic charged bonds, unlike covalent chemical bonds. Essentially, charged atoms have ionic attraction to bind two molecules together, which is why, once airborne as a chemical component, a single smoking particle molecule is attracted and held by the HFC chemistry—fully or partially cured.

Thus, the preferred HFC material being partially cured results in a first particle and second particle capturing areas, formed by the massive active surface of charged particles to attract atoms or molecules of smoke particles that are airborne, and capture them. Thereafter, fluorescing the particle capturing surface with light in differing wavelengths, noted herein, will cause different types of smoke particles to fluoresce under differing UV ranges and the intensity of the fluorescence is dependent on the concentration and the UV range wavelength strength.

By particles is meant herein, such as smoke particles, any chemical component of smoke which will fluoresce under a particular wavelength of light and reveal its presence. For example specific to tobacco is tar and PAH's polycyclic aromatic hydrocarbons—unburned organic or plant matter—THC, tobacco, cellulose, cyanide, formaldehyde and the like. invisible to the naked eye. Thus, the room or vehicle occupants remain unaware that the air in their room is being monitored. This is one primary object of the invention herein in that if room occupants were aware that the device was in an ongoing fashion, capturing portions of smoke or nape particulate, they might try and dispose of it or otherwise hinder its use. Particles may also include in other pathogen particles, in modes of the device, viruses such as the flu virus or the Coronavirus which have diameters or cross sections between 80-125 nm.

The device and system herein also includes or employs a light emitter adapted to emit light upon or through the particle capturing layer in one or a plurality of UV wavelengths. The emitted light wavelengths have been determined to cause differing types of particulate or smoking particles captured on or in the particle capturing layer, to fluoresce. Thus, by deploying substrates having the particle capturing layer thereon for a determined time period, and thereafter illuminating the particles captured in the particle capturing layer, temporal, location-specific proof of smoking of differing substances, is obtainable.

Once the time period in the room of deployment is finished, employing a light emitter that illuminates the captured particles in the particle capturing surface, under differing types of UV light adapted to cause the captured particles to fluoresce, will reveal with temporal certainty, if smoking occurred. Upon the fluoresce of any of the particles in the particle capturing layer when illuminated by the appropriate UV light to cause such to fluoresce, visual proof of the occurrence of smoking, during the time period of deployment of the device, is provided.

As noted herein, this change in visible appearance, where the captured particles in the particle capture to fluoresce, would only be visible when illuminated by a light emitter component such as a flashlight, which emits light at a particular frequency or wavelength such as UVA, UVB and/or UVC range wavelengths. The device having a particle capturing layer which only reveals the presence of smoke particles under specific UV wavelengths is particularly preferred. This is because the room or vehicle occupant will not be able to ascertain smoke has been detected by the device which simply appears to be a no smoking sign or label. Upon the end of their stay or rental however, the devices bearing the particle capturing layer can be concurrently removed and inspected with the appropriate UV light to fluoresce the captured particles, for evidence of smoking which can be matched to the person or party renting the room or vehicle.

The particle capturing surface in a particularly preferred mode of the device herein, is formed as a clear or substantially transparent cationic coating. During manufacture the particle capturing surface may have undergone UV energy curing and my be flood coated via any number of methods and/or apparatus. The particle capturing layer is formed in a thickness having adapted for capture and entrapment of airborne particulate matter, chemicals and/or cancer inducing chemicals emitted or contained in smoke or nape emitted during acts of smoking and/or vaping which come into contact with openings and depressions in and on the particle capturing surface of the device preferably having cationic chemistry.

Preferably the device is formed with the particle capturing surface layered on a first side of an underlying substrate layer. The substrate layer may be paper or plastic or flexible plastic. In one preferred mode of the system herein, a second side of the substrate layer is adapted for removable adherence to a surface in a room or car such as on a mirror, window, or other surface. Alternatively, the substrate may of a material that will support the device sitting on a surface such as a counter or table. The substrate in this mode would be thick paper or plastic which can be folded to form a stand.

Indicia on the substrate or the particle capturing surface will communicate that smoking is prohibited and make the device appear as a warning label attached to a wall or other surface in a room or vehicle. Preferably, the device is installed just prior to the arrival of a guest or vehicle occupant and is then removed concurrently upon their vacating the room or turning in the rental car and matched to the individual room occupant or vehicle renter using an identifier such as a bar code positioned on the device. Scanning or otherwise recording the unique indicia identifying each device on deployment and on retrieval, provides self-authenticating proof that the device was deployed in a particular location, such as a hotel room, for a finite period of time, such as the duration of a guest's stay.

Thus, each substrate bearing the particle capturing exposed surface layer, preferably will include a unique bar code or some other readable code or individual device identifier which matches the individual device to the room or vehicle to which it is deployed for the time frame so deployed. While a barcode or QR Code is preferred since it is machine readable, the device identifier might be an area thereon documented by hand. In this fashion, prior to the arrival of a known guest or individual in a hotel room, or the taking possession of a rental car by a known renter, the scannable identifier such as a bar code on the individual device, may be read by a portable computing device, and correlated using computer software adapted to the task, to the known individual who will occupy the room, building area, or vehicle, for the known duration of time.

Software adapted to the task of reading each scannable product identifier and noting the positioning of the device in a room or car, on a date and time ascertained and automatically correlated to the individual device at the time of placement and scanning, will thereby match the placement of each unique device, within a room or vehicle just prior to occupancy by a guest or renter. Upon the room or car being vacated or returned by that guest or renter, the devices are removed concurrently, and new devices having a fresh particle capturing layer and scannable identifiers are operatively placed prior to the next guest or renter taking possession of the room or vehicle. In this fashion, each device bearing a unique identifier and having a particle capturing layer thereon which is fresh, is placed and removed concurrently with the arrival of each guest or vehicle renter. So positioned and removed, each device is also matched to the room or vehicle occupant and self authenticated as to date of placement and removal by the scanning of the scannable identifier on placement and removal.

Should the room occupant or car renter have smoked while in possession of a room or car and cause a visually discernable change when particles captured in the particle capture layer luminesce when illuminated by UV light. Thus, the uniquely identifiable individual devices matched to the room occupant or renter, which were placed only for the duration of their occupancy, are thereafter easily employed as physical proof that the room or car occupant smoked during the time of their occupancy, which is the same term as the placement of the devices as identified by placement and removal scanning of scannable identifiers thereon.

As noted, a plurality of different types of smoking particles may be captured in the particle capture layer during deployment. However, to the room or vehicle occupant, the device will simply appear as a label or self supporting signage, with indicia thereon prohibiting smoking. Subsequently, the device may be removed and illuminated with light emitters configured to emit a special wavelength such as UVA, UVB and/or UVC range of wavelength. Such hides from the room or vehicle occupant that the device has been triggered which might cause them to destroy it. Employees of the rental agency, hotel, or other venue however, can at any time illuminate particle capturing surface to discern particles captured therein luminescing in a visual change of the particles therein captured from smoke.

Thus, the device having the scannable device identifier is matched to the particular individual occupant of the room or car on the dates self authenticated and noted during deployment-scanning of the scannable identifier on a placement date and time and removal date and time. If smoking is detected by the presence of captured particles which luminesce during illumination under the UV light, the device can then be employed as legal proof that smoking occurred during the dates and time of occupancy of the vehicle or building room by an individual who has been matched to the device identifier on installation just prior to, or just after, their taking possession of the vehicle or room or area of a building.

It is an object of the present invention herein to provide a smoking detection device which may be deployed overtly but is configured to be inspected only under light emitted from a special emitter, thereby providing a device appearing as an overt prohibition of smoking, when it is actually covert in scope, to thereby prevent tampering or destruction.

It is another object of the present invention to provide a component bearing a particle capturing layer adapted to capture particles contained in one or a plurality of types of smoke, which may be placed vertically or horizontally in an area for operation.

It is a further object of this invention to provide a smoking detection component which includes a scannable identifier unique to each individual deployed component, to allow a matching of the individual component to a room or vehicle occupant and time duration of deployment therein.

It is yet another object of this invention to provide a smoking detection component that is self authenticating as to date and duration of placement during scanning of a unique individual scannable identifier, to automatically match the placement and removal thereof to correlate with the date of arrival and departure of the room or vehicle occupant.

It is yet an additional object of the invention to render the scannable identifier which is unique to each smoking detector component in ink which is substantially invisible to a human eye but easily read by a scanning device.

An additional embodiment of the discovery is configuration and provision of the invention capability to confirm airborne particulate matter from smoke coming into contact with the device through scientific analytical equipment such as Fourier Transform Infrared Spectroscopy FTIR, of infrared spectrum absorbency or emission of gas, liquid or solid to precisely confirm chemical composition by a nondestructive method and apparatus.

Before explaining at least one preferred embodiment of the herein disclosed invention in detail, it is to be understood that the disclosed smoking detection invention herein is not limited in its application to the details of construction and to the arrangement of the components in the following description or illustrated in the drawings. The smoke detection invention herein described and disclosed in the various modes and combinations is also capable of other embodiments and of being practiced and carried out in various ways which will be obvious to those skilled in the art. Any such alternative configuration as would occur to those skilled in the art is considered within the scope of this patent. Also, it is to be understood that the phraseology and terminology employed herein are for the purpose of description and should not be regarded as limiting.

BRIEF DESCRIPTION OF DRAWINGS

The accompanying drawings, which are incorporated herein and form a part of the specification, illustrate some, but not the only nor exclusive examples of embodiments and/or figures of the disclosed devices. It is intended that the embodiments and/or figures of the disclosed herein are to be considered illustrative of the invention herein, rather than limiting in any fashion.

In the drawings.

DETAILED DESCRIPTION OF THE PREFERRED EMBODIMENTS

Figure 1:
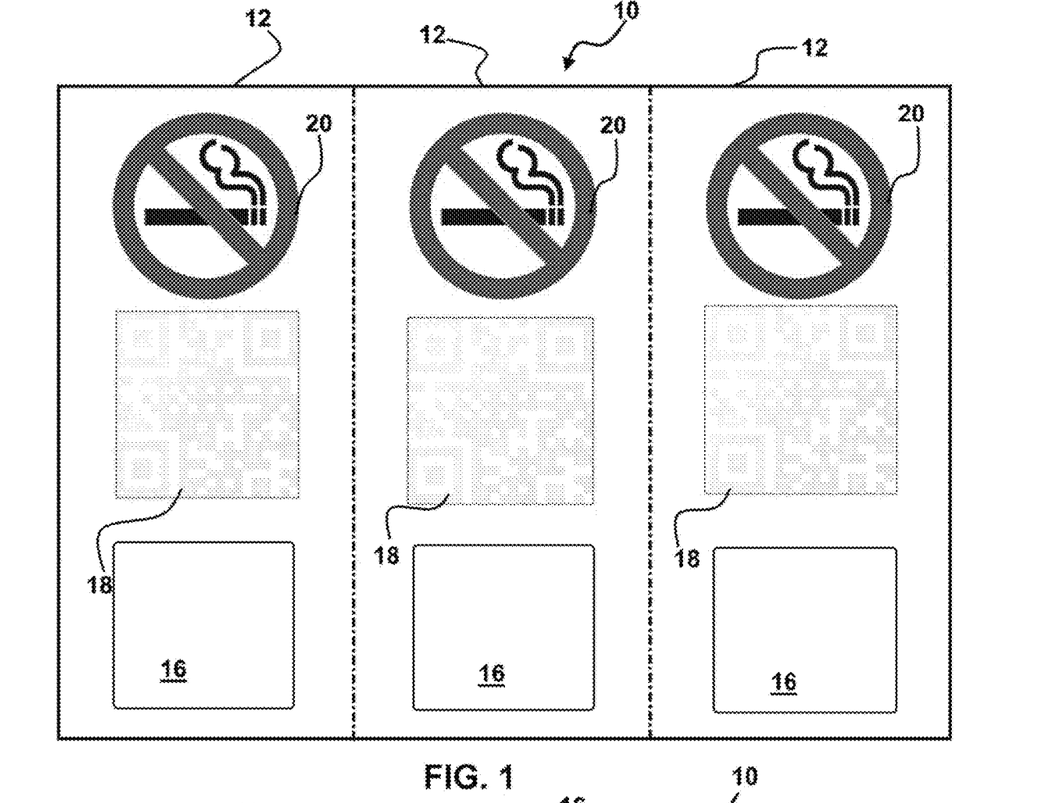
FIG. 1 depicts the present invention having a body formed preferably of transparent substrate material and formed in a frangible fashion of identical deployable smoke detecting components having identical unique identifiers thereon.

Now referring to drawings in FIGS. 1-8, wherein similar components are identified by like reference numerals, there is seen in FIG. 1, the device 10 formed in a plurality of deployable detection components each having a body 12 which preferably is formed preferably of a transparent substrate material 14 (FIG. 2) having a particle capturing surface 16 positioned on a first side of the substrate 14.

Figures 2, 2A:
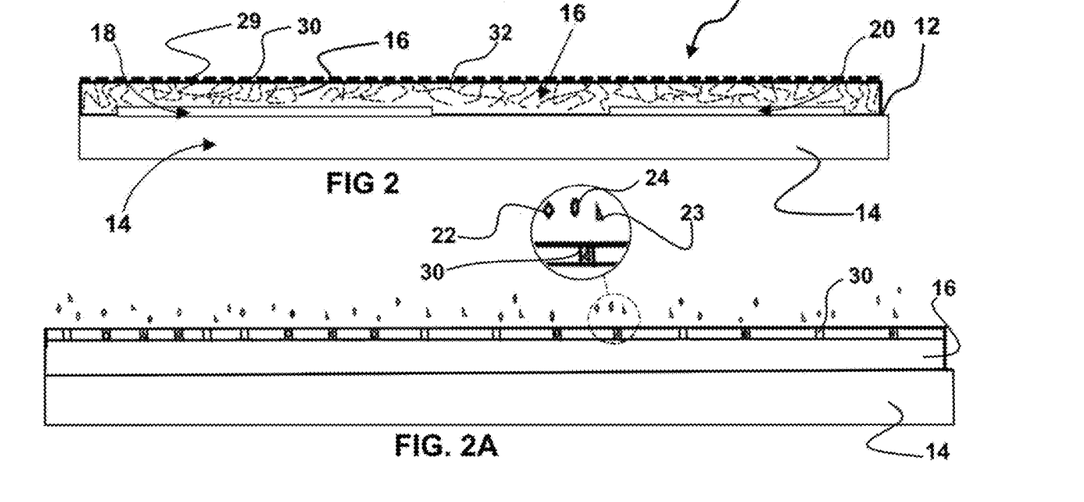
FIG. 2 depicts a sectional view through one of the plurality of smoke detecting components of FIG. 1 and showing the particle capturing layer positioned upon an underlying substrate and having a unique identifier thereon and optionally indica thereon prohibiting smoking.
FIG. 2A shows another sectional view of the device showing depressions or openings communicating through an air-exposed surface layer of the particle capturing layer where the openings are sized for communication of particles there through, where they are captured by ionic attraction or adhesive or other attraction to a held position against the underlying layer.

In all modes of the device 10 for mounting to a surface such as a wall, mirror or window, the substrate 14 is preferably a clear or transparent vinyl or polymeric film with removably adhereable adhesive positioned on a second surface thereof. This second side is employed for mounting the body 12 of the device 10 to a position for a determined amount of time. The substrate 14 is preferably a substantially transparent polymeric material for example but in no way limiting materials such as polypropylene, polyethylene or any clear film with flexibility. By substantially transparent is meant sufficiently clear to allow a human user or a electronic scanner to see particles from smoke trapped in the particle capturing surface layer when the appropriate UV wavelength is communicated thereto. Darker colored materials may inhibit such viewing, however, the substrate may also be opaque where UV light is to be focused upon the particle capturing layer 16 from a position there above and not communicated through the substrate 14. Where the device 10 is not attached to a surface such as a wall or mirror, the body can have a substrate 14 which is folded or molded to be self supporting, such as in an "L" shape or A-frame shape so the body is self supporting when positioned atop a counter or table or the like.

Additionally shown in FIG. 1, are the unique detection component identifiers 18 which uniquely identify each smoke detection component. Where provided in sets such as in FIG. 1, all for positioning in the same room or vehicle, each of the identifiers 18 may be identical since all of the plurality of detection components are to be removably deployed in the same location for the same time duration.

Preferably the identifiers 18 are covert and not discernable to a room or vehicle occupant to enhance the stealth properties of the device 10. Such may be covert QR Codes or two or three-dimensional bar codes printed using UV-only visible inks which will fluoresce upon excitation of UV light for reading and/or documentation. Such will allow the detector devices 10 to be scanned using a scanner device and light emitter rendering the identifiers 18 temporarily visible, and then placed in position whereupon the identifiers 18 will remain substantially un-viewable or be coded to be undiscernable to the naked eye.

Further depicted in FIG. 1, is viewable indicia 20 positioned on each detection component which communicates a message of the prohibition of smoking in the area of the location of the detection component, and thereby render the device 10 stealth as to the real purpose to prevent removal and vandalizing of the detection components. When deployed to a room or vehicle area, the second side of the body 12 of the device 10 will have removably adhereable adhesive, or have a charged attraction thereof, configured to temporarily hold the body 12 of the device 10 to a surface for a duration of time the room or vehicle is occupied by an individual.

FIG. 2 depicts a sectional view through a body 12 of the device 10. As shown, the particle capturing layer or surface 16 is located on the first side of the body 12 of the detection component device 10 in an engagement to an underlying substrate 14. Preferably, both the substrate 14 and the particle capturing surface 16 are sufficiently transparent to allow for communication of UV light there through, and to allow a user or scanner viewing of any smoking particles 22-24 in FIGS. 3-6, captured in the particle capturing surface 16 which luminesce under a particular wavelength of UV light.

Also shown in FIG. 2, are the unique identifier 18 such as a bar or QR Code as well as the indicia 20. However, both may be located differently upon the body 12 forming the deployable smoke detection component and the depiction should not be considered limiting. As noted, while the indicia 20 is to be viewable and readable by a room or vehicle occupant, the identifier 18 is not to be discernable by the room occupant, since it uniquely identifies each device 10 so it can be recorded as to when it was deployed, and when it is retrieved from the room or vehicle in which it is placed.

Additionally depicted in FIG. 2, are the preferred depressions 30 formed into the exposed surface 29, and the passages 32 formed in the underlying layer which communicate with the depressions 30 much like a sponge. In the depicted mode, a first capturing layer is defined by the depressions 30 and the exposed surface 29 in which they are positioned. A secondary particle capturing layer is formed by the passages 32 in the underlying layer of the particle capturing surface 16. The diameter of both the depressions 30 and the communicating passages 32 is noted above to be in a diameter range which is always larger than the diameter of the smoke particles intended to be captured to allow them to be pulled in and captured.

In FIG. 2A is shown a sectional view of a mode of the device 10 showing the depressions 30 formed as openings communicating through an exposed surface 29 layer of the particle capturing surface 16. The diameter of the depressions 30 formed as openings are sized for communication of the particles 22-24 there through where they are captured by ionic attraction or adhesive or other attraction to a held position within the underlying layer.

As can be discerned from FIGS. 3-6, the smoke detection components can be adapted to detect one or a plurality of different types of smoking in an area by the provision of a light-emitting component 26 having emitters 28 which are configured to emit one, two, or three wavelengths of UV light therefrom. Where only one type of smoking is an issue, then the light emitter component 26 may only project UV light at a single wavelength such as in FIGS. 3-5 where only one type of smoke particle captured in the particle capturing surface 16 will luminesce.

In all modes of the smoking detecting device 10 herein the employed emitters 28 will communicate the appropriate UV light energy radiation to the captured particles 22-24 or other substance particles sought for detection, to thereby excite a captured particle substance's molecular electrons 12 at one or a plurality of light wavelengths thereby causing an emission of light therefrom at a longer wavelength and lower energy in the visible range, thereby resulting in a fluorescence.

As shown, the system herein can also be configured to detect a plurality of different types of smoking by the provision of a light-emitting component 26 having light emitters 28 therein, which project UV light in two or three or more wavelengths which are adapted to luminesce captured smoking particles under those UV wavelengths such as UVA range which is 315-400 nm; and/or UVB range which is 280-315 nm; and/or UVC range which is 100-280 nm.

In another mode, the system can be configured to evidence smoking by capturing and fluorescing R & S-Nicotine. For example, but in no way limiting, nicotine is biologically converted into cotinine within the body of a smoker. Cotinine is exhaled in a similar manner to how the body rids itself of carbon dioxide from respiration. There are several discrete excitation wavelength peaks of 180 and 215 nm and ranges of 220-280 nm which will fluoresce nicotine particles. Nicotine has several isomers (mirror-like opposing structures) known as R & S Nicotine, with S-nicotine excited at 180, 206, 215 and 240 nm. S-nicotine and S-nornicotine will fluoresce substantially at 220-280 nm. Where not defined alternatively herein, the term substantially means plus or minus twenty percent.

Where Tar is to be detected it will luminesce at a wavelength of 400 nm and emitters 28 can be configured to emit light in that range.

Where smoking of Cannabis is to be detected, tetrahydrocannabinol (THC) in cannabis smoke will fluoresce at substantially 220 to 300 nm. Alternatively, for cannabis neutral cannabinoids (CBD, CBG, THC's) peaks when illuminated by UV light at 220 and 235 nm.

Where cannabinoid acids (CBDA, CBGA & THCA) are to be detected in the captured particles, emitters 28 would be employed which emit light at 220, 225, 260 & 300 nm or in a range between 220-300 nm.

Where CBN (degradation product of THC) is to be detected in the captured smoke particles, emitters 28 would be employed to emit light at 220 & 290 nm for peak luminescence or in the range from 220-290 nm.

Where smoking of Vape devices or E-cigarettes is to be detected, the capture of propylene glycol and/or glycerine in the particle capturing surface 16 will occur. Emitters in the light emitter component 26 projecting light from 300 to 405 nm will work to peak visual luminescence while emitters 28 emitting light 340 and 550 nm will still provide visually discernable particles in the capturing surface 16 which will luminesce under the light in this range.

The lower the nm wavelength, the higher the excitation energy to cause the visually discernable luminescence of captured particles in the particle capturing layer 16. Formation of the emitters 28 to emit differing UV wavelengths can be accomplished in conventional fashion using H—mercury, H+—mercury plus, D—iron, Q—indium V—gallium.

Figure 3:
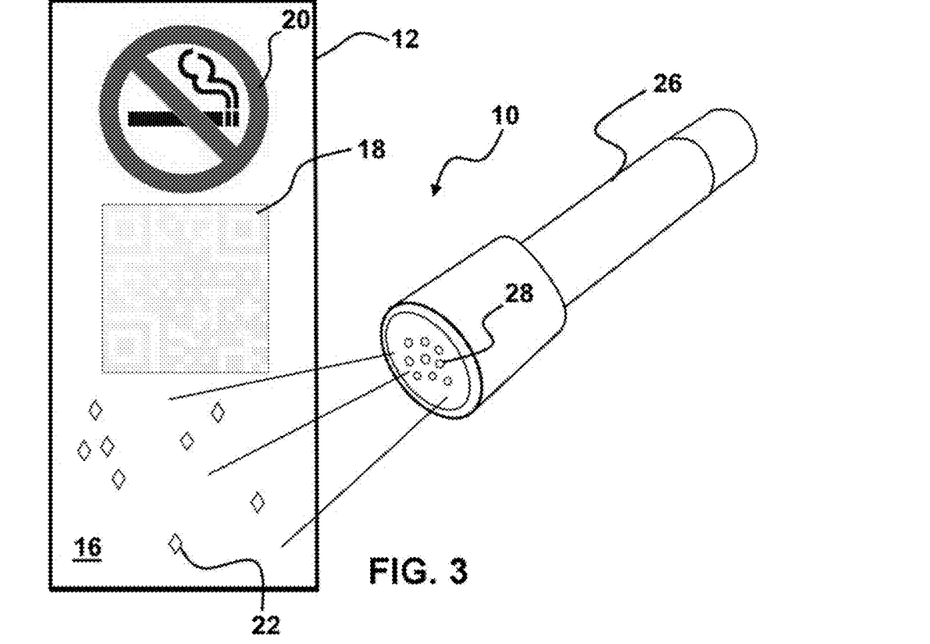
FIG. 3 depicts a deployed device being illuminated by a light emitter which emits UV light adapted to fluoresce a first type of particle emitted by smoking and captured in the particle capturing layer.
Figure 4:
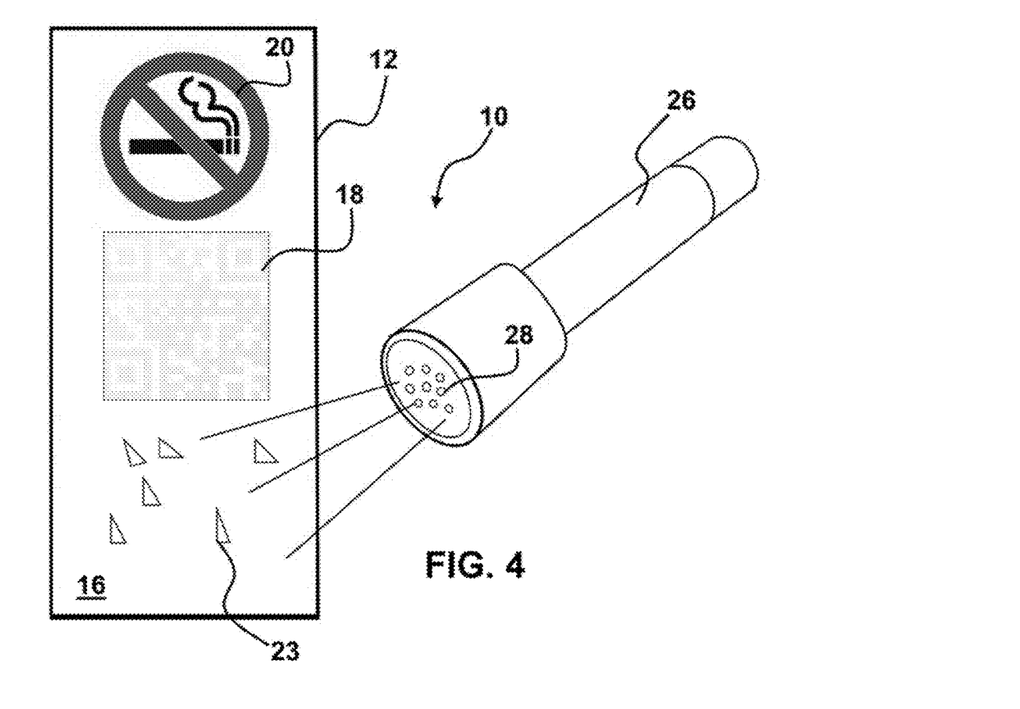
FIG. 4 depicts a deployed device being illuminated by a light emitter which emits UV light adapted to fluoresce a second type of particle emitted by smoking and captured in the particle capturing layer.
Figure 5:
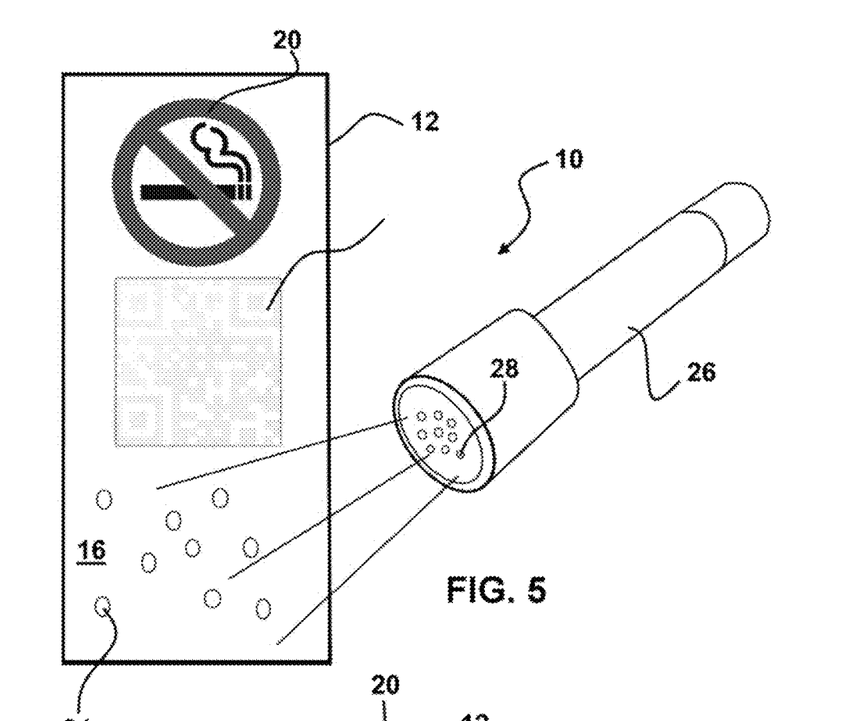
FIG. 5 depicts a deployed device being illuminated by a light emitter which emits UV light adapted to fluoresce a third type of particle emitted by smoking and captured in the particle capturing layer.
Figure 6:
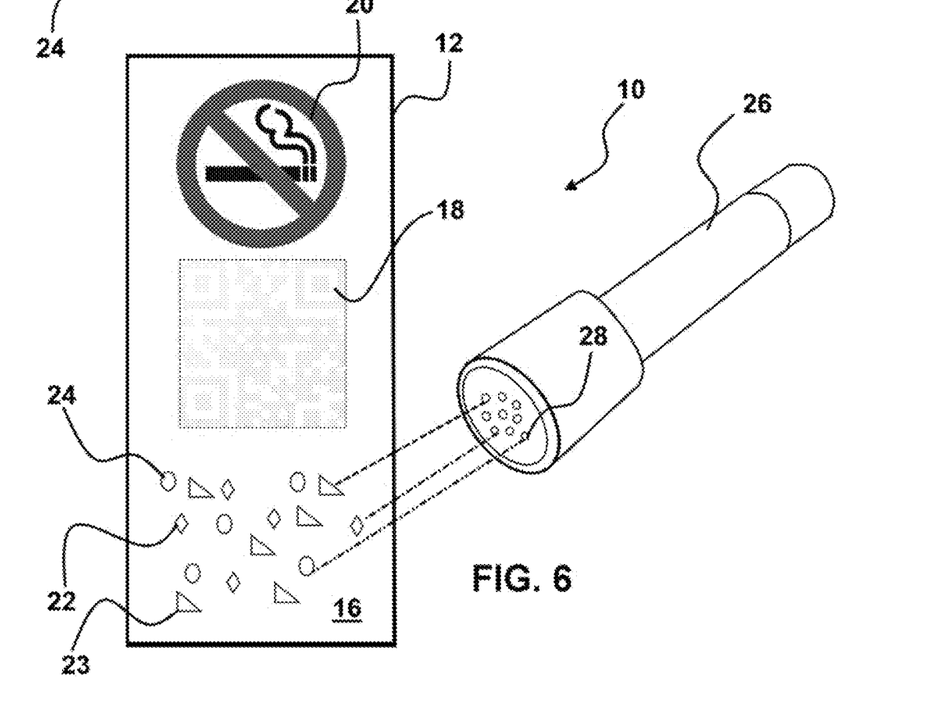
FIG. 6 depicts a deployed device being illuminated by a light emitter which emits UV light in three different wavelengths concurrently which are respectively adapted to fluoresce all of three types of particles emitted by smoke from three types of smoking which have been captured in the particle capturing layer.

As noted, FIGS. 3-5 show modes of the device 10 herein wherein the provided light-emitting component 26 is equipped with emitters 28 which emit UV light in a single range adapted for a single type of captured particle 22, 23, or 24. FIG. 6 shows the mode of the device 10 herein wherein the employed light-emitting component 26 is equipped with a plurality of different emitters 28 where each in the plurality emits UV light in one of three or more ranges to allow detection of smoking through the luminescing of three or more types of smoke particles 22, 23, or 24.

Figure 7:
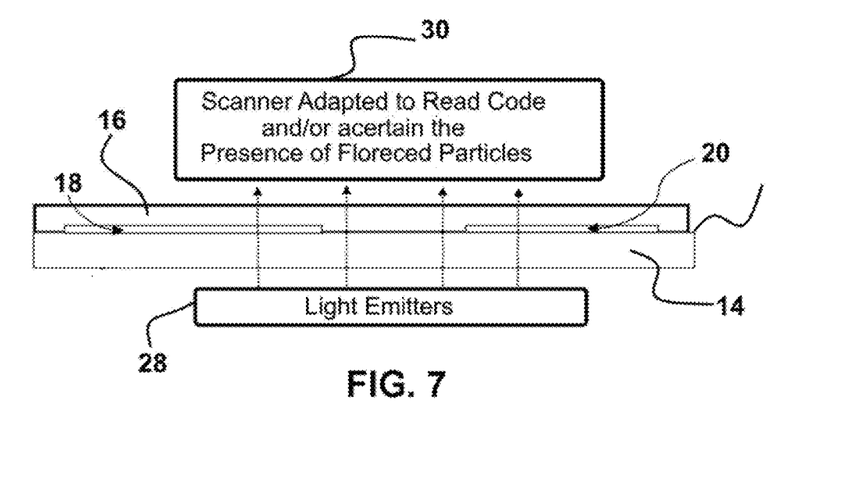
FIG. 7 shows a mode of the device herein wherein the deployed smoke detecting component having a particle capture layer thereon may be machine-read automatically using light emitters adapted to luminesce particles captured in the particle capture layer and a scanner module for capturing images of the particles which luminesce which may be read by optical recognition software of a computer which the scanner transmits the image captured.

Shown in FIG. 7 is a mode of the device 10 and method herein wherein the deployed smoke detecting component having a body 12 with the particle capture layer 16 thereon may be machine-read automatically. Using light emitters 28 adapted to luminesce particles captured in the particle capture surface 16 layer, a scanner module 30 captures images of the excited smoking particles which luminesce. The scanner 30 captured image may then be read by optical recognition software running on a computer to which the scanner transmits the image captured. The software will then determine what type of smoking occurred if any, from the captured scanner 30 image.

Figure 8:
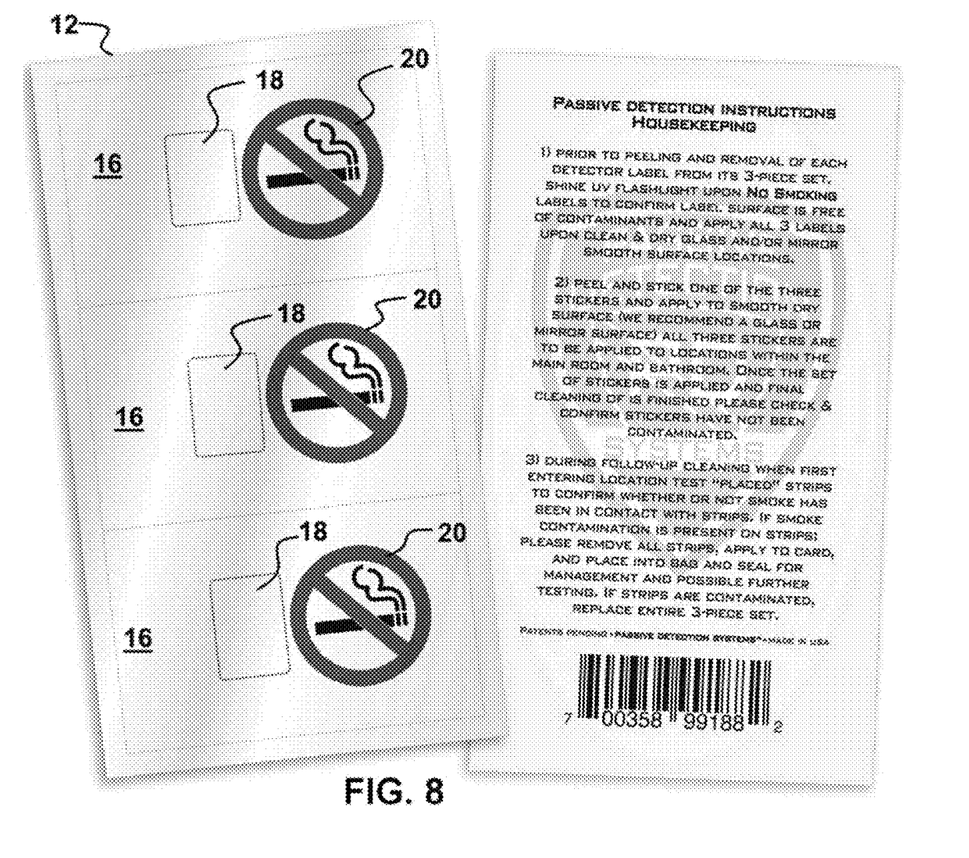
FIG. 8 depicts the substrate of the device from a first side bearing the particle capturing layer and showing indica on the component to prohibit smoking, and shows a second side of the device having deployment instructions thereon which is preferably removably adhereable to a surface.

Finally, FIG. 8 depicts a plurality of smoke detection components such as in FIG. 1, wherein a first side of the device has the particle capturing surface 16 and has discernable indicia 20 prohibiting smoking. Adjacently positioned is a view of the second side of the detection component, having deployment instructions thereon, and having adhesive or the like adapted to removably position the body 12 of each detection component, to a surface.

In a method of employment of the device 10 herein, to detect smoking in a room or vehicle, in a first step the device 10 identifier will be recorded as deployed in an identified room or vehicle, at a deployment time.

The device 10 will remain deployed for a duration of time which is the same time duration as the room or vehicle is occupied by a person.

In a next step, upon the person vacating the room or returning the vehicle to the hotel or rental agency, the device 10 is retrieved, and the date and time of this retrieval is recorded.

In a subsequent step, the particle capturing surface 16, is exposed to light from a light emitter 26, which projects light in a frequency which causes captured particles 22, 23, and 24, in or on the particle capturing surface 16, to luminesce.

If smoking particles are detected in this illumination step, the room occupant or vehicle renter, is billed for violating non smoking rules.

While all of the fundamental characteristics and features of the stealth smoking detection system herein have been shown and described herein, with reference to particular embodiments thereof, a latitude of modification, various changes and substitutions are intended in the foregoing disclosure and it will be apparent that in some instances, some features of the invention may be employed without a corresponding use of other features without departing from the scope of the invention as set forth. It should also be understood that various substitutions, modifications, and variations may be made by those skilled in the art without departing from the spirit or scope of the invention. Consequently, all such modifications and variations and substitutions are included within the scope of the invention as defined by the following claims.

What is claimed is:
1. A smoking detector apparatus, comprising:
a body;
said body having a substrate, said substrate having a first side surface and a second side surface opposite said first side surface;
a particle capturing surface area positioned on said first side of said substrate;
said particle capturing surface area configured to attract and adhere to airborne smoking particles released in smoke emitted from burning tobacco or marijuana, or a Vape device;
said smoking particles adhered to said particle capturing surface area defining captured smoking particles;
said particle capturing surface area and said substrate located thereon, being sufficiently transparent to allow for communication of light therethrough;
a light emitter;
emitted light from said light emitter being in a wavelength range substantially between 180-400 nm;

said captured particles luminescing at a detection time occurring when said emitted light is communicated through said particle capturing surface area to form luminesced captured particles; and whereby a presence of said luminesced captured particles define physical proof that smoking occurred in an area proximate to said smoking detector, prior to said detection time.

2. The smoking detector apparatus of claim 1, additionally comprising:

an identifier positioned upon said substrate;

said identifier correlatable by a user to a deployment time occurring when said smoking detector is located to a detection position, within an enclosed room or within a vehicle;

said presence of said luminesced captured particles defining physical proof that said smoking occurred in an area proximate said detection position, during a defined time period; and said defined time period being a duration of time between said deployment time and said detection time.

3. The smoking detector apparatus of claim 1, wherein said particle capturing surface area comprises:

a first side of said particle capturing surface area engaged upon said substrate;

a second side of said particle capturing surface area positioned opposite said first side thereof, and defining an exposed surface;

said exposed surface defining a first capturing layer for holding said captured particles; and depressions formed into said exposed surface, said depressions having a minimum depression diameter, said minimum depression diameter being in a range between $10^{-9}$ meters and $275 \times 10^{-12}$ meters, wherein said depressions define first holding areas for said captured particles.

4. The smoking detector apparatus of claim 2, wherein said particle capturing surface area comprises:

a first side of said particle capturing surface area engaged upon said substrate;

a second side of said particle capturing surface area positioned opposite said first side thereof, and defining an exposed surface;

said exposed surface defining a first capturing layer for holding said captured particles; and depressions formed into said exposed surface, said depressions having a minimum depression diameter, said minimum depression diameter being in a range between $10^{-9}$ meters and $275 \times 10^{-12}$ meters, wherein said depressions define first holding areas for said captured particles.

5. The smoking detector apparatus of claim 3, wherein said particle capturing surface area comprises:

a secondary particle capturing layer for said captured particles formed between said exposed surface and said first side of said particle capturing surface area;

passages positioned within said secondary particle capturing layer, said passages being in communication with said depressions;

said passages having a minimum passage diameter substantially the same as said minimum depression diameter; and wherein said passages define secondary holding areas for said captured particles which flow therein through said depressions.

6. The smoking detector apparatus of claim 4, wherein said particle capturing surface area comprises:

a secondary particle capturing layer for said captured particles formed between said exposed surface and said first side of said particle capturing surface area;

passages positioned within said secondary particle capturing layer, said passages being in communication with said depressions;

said passages having a minimum passage diameter substantially the same as said minimum depression diameter; and wherein said passages define secondary holding areas for said captured particles which flow therein through said depressions.

7. The smoking detector apparatus of claim 5, additionally comprising:

said particle capturing surface is formed of HFC material; and said HFC material forming said secondary particle capturing layer being cross-linked by a partial curing of said HFC material within said secondary particle capturing layer.

8. The smoking detector apparatus of claim 6, additionally comprising:

said particle capturing surface is formed of HFC material; and said HFC material forming said secondary particle capturing layer being cross-linked by a partial curing of said HFC material within said secondary particle capturing layer.

9. The smoking detector of claim 6, additionally comprising:

an electronic scanner positioned within a housing;

said electronic scanner having said light emitter positioned within said housing;

an opening for insertion into said housing, of said body having said captured particles upon said particle capturing layer; and a scanner module positioned within said housing, said scanner module configured for generating a digital captured image of said smoking particles which luminesce, and said digital captured image employable to prove smoking occurred during said defined time period.

10. A method for detecting smoking employing the smoking detector apparatus of claim 2, comprising the steps of:

locating said smoking detector to said detection position within a room or vehicle;

recording said deployment time as a time of day when said smoking detector was located to said detection position;

associating said identifier with said deployment time;

associating said identifier with said detection position;

retrieving said smoking detector at said detection time;

exposing said particle capturing surface area to said emitted light from said light emitter;

viewing said particle capturing surface area to ascertain a presence of said luminesced captured particles; and upon a presence of said luminesced captured particles, associating said smoking detector with an occupant of said detection position between said deployment time and said detection time; and billing said occupant for smoking charges.

11. A method for detecting smoking employing the smoking detector apparatus of claim 6, comprising the steps of:

locating said smoking detector to said detection position within a room or vehicle;

recording said deployment time as a time of day when said smoking detector was located to said detection position;
associating said identifier with said deployment time;
associating said identifier with said detection position;
retrieving said smoking detector at said detection time;
exposing said particle capturing surface area to said emitted light from said light emitter;
viewing said particle capturing surface area to ascertain a presence of said luminesced captured particles; and
upon a presence of said luminesced captured particles, associating said smoking detector with an occupant of said detection position between said deployment time and said detection time; and
billing said occupant for smoking charges.

* * * * *